United States Patent [19]
McManis et al.

[11] Patent Number: 6,067,575
[45] Date of Patent: *May 23, 2000

[54] SYSTEM AND METHOD FOR GENERATING TRUSTED, ARCHITECTURE SPECIFIC, COMPILED VERSIONS OF ARCHITECTURE NEUTRAL PROGRAMS

[75] Inventors: Charles E. McManis, Sunnyvale; Frank Yellin, Redwood City, both of Calif.

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/569,397

[22] Filed: Dec. 8, 1995

[51] Int. Cl.[7] .............................. G06F 15/63; G06F 9/45

[52] U.S. Cl. .......................................... 709/300; 395/701

[58] Field of Search .................................... 395/712, 572, 395/704; 380/4; 709/300–305

[56] References Cited

U.S. PATENT DOCUMENTS

| | | | |
|---|---|---|---|
| 5,224,160 | 6/1993 | Paulini et al. | 380/4 |
| 5,343,527 | 8/1994 | Moore | 380/4 |
| 5,359,659 | 10/1994 | Rosenthal | 380/4 |
| 5,421,006 | 5/1995 | Jablon et al. | 395/575 |
| 5,432,937 | 7/1995 | Tevanian et al. | 395/712 |
| 5,475,753 | 12/1995 | Barbara et al. | 380/4 |
| 5,479,509 | 12/1995 | Ugon | 380/23 |
| 5,559,884 | 9/1996 | Davidson et al. | 380/4 |
| 5,724,425 | 3/1998 | Chang et al. | 380/25 |

FOREIGN PATENT DOCUMENTS

| | | |
|---|---|---|
| 0 328 232 | 8/1989 | European Pat. Off. . |
| 0 464 526 A2 | 1/1992 | European Pat. Off. ..................... 9/45 |
| 96308722 | 2/1999 | European Pat. Off. . |

OTHER PUBLICATIONS

Sun Microsystems, The Java Language Environment : A White Paper, pp. 1–86, Oct., 1995.

Mohay G. et al., "Calss–computer architecture for secure systems", Sixteenth Australian Computer Conference. ACSC–16, Brisbane, QLD., Australia, Feb. 1993, (pp. 1–5).

Van Hoff A., "Java and Internet programming", Dr. Dobb's Journal, Aug. 1995, USA, vol. 20, No. 8, pp. 56, 58, 60–61, 101–102, XP000570180 ISSN 1044–789X.

van Hoff, Arthur; java and Internet Programming: Dr. Dobb's Journal on CD–ROM; pp. 1–8, Aug., 1995.

Schneier, Bruce; Untangling Public–Key Cryptography; Dr. Dobb's Journal on CD–ROM; pp. 1–13, May 1992.

(List continued on next page.)

*Primary Examiner*—Lucien U. Toplu
*Assistant Examiner*—Pat Caldwell
*Attorney, Agent, or Firm*—Pennie & Edmonds LLP

[57] ABSTRACT

A distributed computer system has a program compiling computer and a program executing computer. The program compiling computer is operated by a compiling party and includes a compiler that, when the digital signature of the originating party of an architecture neutral program has been verified, (A) compiles the architecture neutral program code of the architecture neutral program into architecture specific program code in the architecture specific language identified by the compile to information in the architecture neutral program, and (B) appends to the architecture specific program code a digital signature of the compiling party to generate an architecture specific program. The program executing computer is operated by an executing party and includes an architecture specific program executer that executes the architecture specific program code of the architecture specific program when the digital signature of the originating party of the architecture neutral program has been verified, the digital signature of the compiling party of the architecture specific program has been verified, and the compiling party has been determined to be a member of a defined set of trusted compiling parties.

26 Claims, 3 Drawing Sheets

OTHER PUBLICATIONS

Stallings, William; SHA: The Secure Hash Algorithm; Dr. Dobb's Journal on CD–ROM; pp. 1–3, Apr., 1994.

Schneier, Bruce; One–Way Hash Functions; Dr. Dobb's Journal on CD–ROM; pp. 1–9, Sep., 1991.

Stallings, William; Make it real (using authentication in network security; LAN Magazine v8 n9 p105(6)), Sep., 1993.

Davida et al; Defending Systems Against Viruses through Cryptographic Authentication; IEEE; pp. 312–318, Jul., 1989.

Gosling et al; The Java language Environment: A White Paper, May 1995.

SYSTEM AND METHOD FOR GENERATING TRUSTED, ARCHITECTURE SPECIFIC, COMPILED VERSIONS OF ARCHITECTURE NEUTRAL PROGRAMS

The present invention relates generally to distributed computer systems, and particularly to a program compilation system and method in which architecture neutral executable programs are compiled by a trusted third party in such a way that recipients of the compiled program can verify the identity of the corresponding architecture neutral program and can verify that it was compiled by the trusted third party.

BACKGROUND OF THE INVENTION

The term "architecture" is defined for the purposes of this document to mean the operating characteristics of a family of computer models. Examples of distinct architectures are: Macintosh computers, IBM PC compatible computers using the DOS or Windows operating systems, SUN Microsystems computers running the Solaris operating system, and computer systems using the Unix operating system.

The term "architecture neutral" is defined for the purposes of this document to refer to ability of certain programs, such as programs written in the Java (a trademark of Sun Microsystems, Inc.) language, to be executed on a variety of computer platforms using a number of different computer architectures.

The term "architecture specific" is defined for the purposes of this document to refer to the requirement that certain programs be executed only on computer platforms using a single computer architecture. For instance, object code programs written in the 80486 assembler language can only be executed on computers using the IBM PC compatible computer architecture (as well as in other computers that contain IBM PC compatible computer emulators).

Important features of architecture neutral programs (ANPrograms) include the architecture independence of programs written in the architecture neutral language (ANLanguage). For example, Java bytecode programs can be executed on any computer platform having a Java bytecode interpreter. An additional important feature of Java bytecode programs is that their integrity can be directly verified prior to execution by a Java bytecode verifier. A Java bytecode verifier determines whether the program conforms to predefined integrity criteria. Such criteria include operand stack and data type usage restrictions that ensure that Java bytecode programs cannot overflow or underflow the executing computer's operand stack and that all program instructions utilize only data of known data types. As a result, a Java bytecode program cannot create object pointers and generally cannot access system resources other than those which the user has explicitly granted it permission to use.

Unfortunately, distributing executable programs in an ANLanguage causes the ANProgram to run less efficiently than it would if it could take advantage of architecture specific features. For example, Java bytecode programs executed by a Java bytecode interpreter typically run 2.5 to 5 times as slow as the equivalent architecture specific programs (ASPrograms) compiled in corresponding architecture specific languages (ASLanguages). While a factor of five speed reduction is actually considered to be unusually good for an ANProgram executer (i.e., interpreter), it is a sufficient loss of efficiency that some users will require or insist upon the ability to use equivalent programs compiled in an ASLanguage.

Compilers that can compile an ANProgram into an equivalent ASProgram can be written. However, they may be prohibitively expensive for the end user. In addition, the integrity of the equivalent compiled ASProgram cannot be verified directly from the compiled ASProgram code by an ANProgram integrity verifier. Thus, in the case of Java bytecode programs, the use of ANPrograms compiled into equivalent ASPrograms potentially results in the loss of one of the most valuable features of an ANLanguage.

However, there are some legitimate (or legal) tasks that can be performed by integrity non-verifiable ASPrograms but which cannot be performed by integrity verifiable ANPrograms. These include tasks that would otherwise violate the operand stack and data type usage restrictions imposed on the integrity verifiable ANPrograms. In addition, such ASPrograms can be executed much faster than ANPrograms. As a result, there are number of reasons why it is desirable to have a computer system that is designed to primarily execute integrity verifiableANPrograms but also has the capability of executing integrity non-verifiable ASPrograms.

Although compilation of ANPrograms by a third party is possible, such compilations require that the third party be authenticated. That is, it must be possible to verify from the information in the compiled ASProgram that it was compiled by a specific trusted third party. Even better, it should also be possible to authenticate that the compiled ASProgram was generated by a specific trusted compiler. And, since the integrity of the compiled ASProgram with respect to predefined integrity criteria cannot be directly verified, the compiled ASProgram should include information that in a verifiable manner identifies the corresponding ANProgram from which it was compiled and the ASLanguage in which it was compiled.

Thus, it is an object of the present invention to provide an ANProgram compiler and compilation method that enables the user of an ASProgram compiled from a corresponding ANProgram to authenticate the identity of who compiled the ANProgram, the identity of the corresponding ANProgram, and the ASLanguage in which the ASProgram was compiled.

It is another object of the present invention to provide an ANProgram executer and execution method that enables integrity verifiable ANPrograms being executed to call integrity non-verifiable ASPrograms that are trusted or that have verifiable sources and compilation information so that essentially all legitimate tasks can be performed, while preventing from being called ASPrograms whose sources, compilation information, and integrity cannot be verified.

SUMMARY OF THE INVENTION

In summary, the present invention is a computer network that comprises a program compiling computer and a program executing computer.

The program compiling computer is operated by a compiling party and includes storage that stores an architecture neutral program generated by an originating party. The architecture neutral program contains architecture neutral program code and a digital signature of the originating party. The program compiling computer also includes a signature verifier that verifies the digital signature of the originating party to verify that the signature of the originating party matches (i.e., was generated using) the architecture neutral program to which it is attached.

The program compiling computer further includes a compiler that, when the digital signature of the originating party has been verified compiles the architecture neutral program code into architecture specific program code in the architecture specific language identified by the compile to information. The compiler utilizes a signature geneator to append to the architecture specific program code a digital signature of the compiler program, where the compiler signature signs a set of information that includes the compiled architecture specific program code plus the signature on the architecture neutral program. In the preferred embodiment the compiler utilizes the signature generator to also append to the architecture specific program code a digital signature of the compiling party, where compiling party signature signs a set of information that includes the compiled architecture specific program code, the signature on the architecture neutral program and the compiler signature.

The program executing computer is operated by an executing party and includes storage that stores the architecture neutral and specific programs. It further includes a signature verifier that (A) verifies the digital signature of the originating party in the architecture neutral program, and (B) verifies the digital signature of the compiler in the architecture specific program and/or verifies the digital signature of the compiling party in the architecture specific program. The term "verifies a signature" means that a procedure is performed to determine that the signature matches (i.e., was in fact generated from) the set of information allegedly signed by the signature.

The program executing computer also includes an architecture specific program executer that, when the digital signatures in the architecture specific program have been verified, executes the architecture specific program code of the architecture specific program.

In the preferred embodiment, the architecture neutral program is embodied in an object that contains a digital signature that includes a message digest uniquely associated with the architecture neutral program. The architecture specific program generated by the compiler includes:

the compiled, architecture specific code;

the digital signature of the corresponding architecture neutral program as signed by the party that provided the architecture neutral program;

a digital signature by the compiler itself, including a message digest of the compiled program and information identifying the compiler used to compile the program, and signed using the compiler's private encryption key; and a digital signature by the trusted party performing the compilation, including a message digest of the compiled program and information identifying the trusted party, and signed using the compiling party's private encryption key.

A generally available, trusted repository of public encryption keys, sometimes called a naming service, holds the public keys for the compiler and the trusted compilingparty. Using these public encryption keys all recipients of the compiled program can decrypt the digital signatures in the compiled program to verify that the compiled program was compiled by the indicated trusted party and by the indicated compiler, and also to verify the identity of the corresponding architecture neutral program. Optionally, the recipient of the compiled program can use a program verifier to verify the proper operation of the corresponding architecture neutral program prior to executing the compiled architecture specific program.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
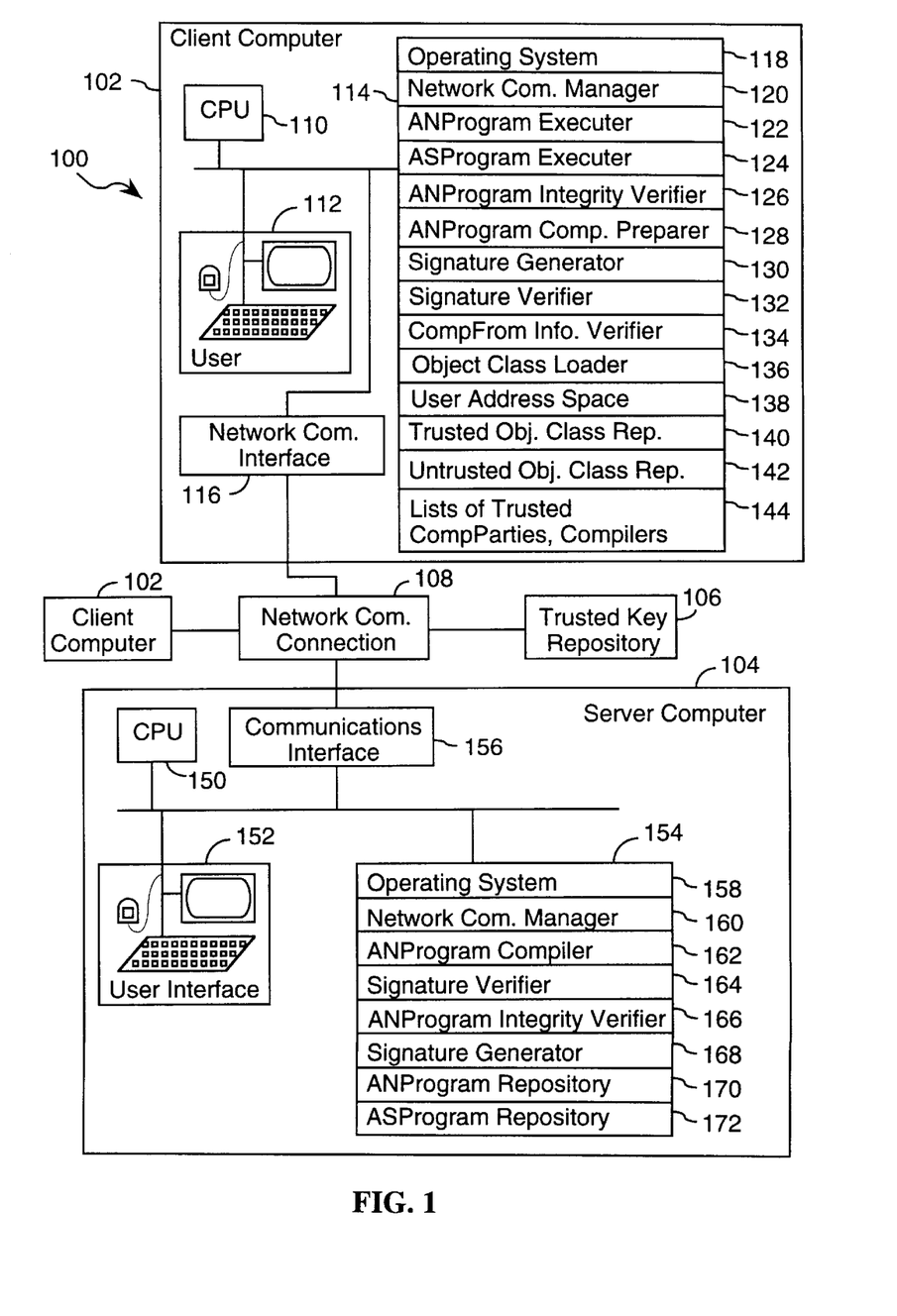
FIG. 1 is a block diagram of a distributed computer system incorporating a preferred embodiment of the present invention.

Referring to FIG. 1, there is shown a computer network 100 having many client computers 102, a server computer 104, and a trusted key repository 106. The client computers 102 are connected to each other and the server computer 104 and the trusted key repository 106 via a network communications connection 108. The network communications connection may be a local or wide area network, the Internet, a combination of such networks, or some other type of network communications connection.

While most of the client computers 102 are desktop computers, such as Sun workstations, IBM compatible computers, and Macintosh computers, virtually any type of computer could be a client computer. Each of these client computers includes a CPU 110, a user interface 112, a memory 114, and a network communications interface 116. The network communications interface enables the client computers to communicate with each other, the server computer 104, and the trusted key repository 108 via the network communications connection 106.

The memory 114 of each client computer 102 stores an operating system 118, a network communications manager 120, an ANProgram (architecture neutral program) executer 122, an ASProgram (architecture specific program) executer 124, and ANProgram integrity verifier 126, an ANProgram compiling preparer 128, a signature generator 130, a signature verifier 132, a compiling information (CompInfo) verifier 134, an object class loader 136, a user address space 138, a trusted object class repository 140, an untrusted object class repository 142, and lists 144 of known, trusted compiling parties and trusted compilers. The operating system is run on the CPU 110 and controls and coordinates running the programs 120–136 on the CPU in response to commands issued by a user with the user interface 112.

The ANProgram executer 122 of each client computer 102 executes ANPrograms in the object classes stored in the trusted and untrusted object class repositories 140 and 142. Moreover, the ANPrograms are written in an ANLanguage for which the user may establish predefined integrity criteria, such as stack and data usage restrictions, so that the ANPrograms will not perform illegal tasks. Thus, the integrity of the ANPrograms can be directly verified by the ANProgram integrity verifier 126 prior to execution by determining if the program satisfies the predefined integrity criteria. These ANPrograms are therefore considered integrity verifiable ANPrograms.

In the preferred embodiment, the integrity verifiable ANPrograms are written in the Java bytecode language. Moreover, the ANProgram executer 122 and the ANProgram verifier 124 are respectively a Java bytecode program interpreter and a Java bytecode program verifier that respectively execute and verify the Java bytecode programs. The Java bytecode verifier and interpreter are products of Sun Microsystems, Inc.

However, each client computer 102 has an associated specific architecture for which programs may be written in a corresponding ASLanguage and executed by the ASProgram executer 122. The ASLanguage does not require that ASPrograms written in the ASLanguage satisfy the predefined integrity criteria of the ANLanguage. As a result, the ASPrograms can perform tasks that cannot be performed by the ANPrograms because they are not burdened by the restrictions imposed by the predefined integrity criteria of the ANLanguage. Unfortunately, however, this also means that their integrity cannot be directly verified by the ANProgram integrity verifier 126 and are therefore considered integrity non-verifiable.

Nevertheless, as indicated earlier, an ANProgram runs less efficiently than the same program compiled in an ASLanguage. Thus, the user of a client computer 102 may wish to have an ANProgram compiled by the server computer 104 for the ASLanguage associated with the user's client computer so the compiled ASProgram can be executed there by the ASProgram executer 124. Or, the user may wish to have the ANProgram compiled for the ASLanguages associated with other client computers if the compiled ASPrograms are going to be distributed and executed by the ASProgram executers 124 of other client computers.

Preparing an Architecture Neutral Program for Compiling

Figure 2:
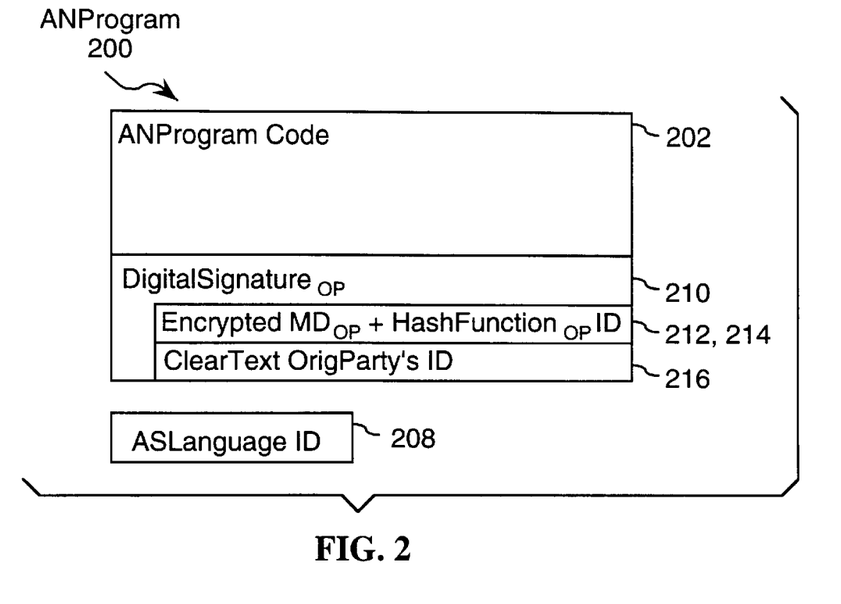
FIG. 2 depicts the structure of an architecture neutral program in accordance with a preferred embodiment of the present invention.

Referring to FIGS. 1 and 2, when an originating party (OrigParty) wishes to have an ANProgram 200 compiled by the server computer 104, the OrigParty issues a command with the user interface 112 to invoke the ANProgram compiling preparer 128 and instruct it to prepare the ANProgram for compiling. The ANProgram may be in an object class contained In one of the trusted or untrusted object class repositories 140 or 142. Table 1 contains a pseudocode representation of the procedure used by the ANProgram compiling preparer 128 to prepare the ANProgram for compiling by the server computer 104. The pseudocode used in Tables 1–3 uses universal computer language conventions. While the pseudocode employed here has been invented solely for the purposes of this description, it is designed to be easily understandable by any computer programmer skilled in he art.

Referring to FIGS. 1 and 2 and Table 1, the ANProgram compiling preparer 128 first calls the ANProgram integrity verifier 126 and instructs it to verify the integrity of the ANProgram code 202 of the ANProgram 200. This is done to make sure that the ANProgram code satisfies the predefined integrity criteria of the ANLanguage prior to being sent to the server computer 104 for compiling. If the ANProgram code does not satisfy the predefined integrity criteria, the ANProgram integrity verifier sends back a failed result to the ANProgram compiling preparer. In response, the ANProgram compiling preparer aborts the compiling preparation procedure and generates an appropriate message indicating this.

However, if the ANProgram code 202 does satisfy the predefined integrity criteria, then the ANProgram integrity verifier 126 sends back a passed result to the ANProgram compiling preparer 128. The ANProgram compiling preparer then calls the signature generator 130 and instructs it to generate the OrigParty's digital signature (DigitalSignature$_{OP}$) 210 that can be verified to ensure that the ANProgram 200 was generated by the trusted OrigParty. The signature generator generates the DigitalSignature$_{OP}$ by first generating a message digest (MD$_{OP}$) 212 of the ANProgram code 202. It does this by computing a hash function, HashFunction$_{OP}$, on the data bits of the ANProgram code. The hash function used may be either a predetermined hash function or one selected by the OrigParty. For purposes of this document, the HashFunction$_{OP}$ corresponds to the OrigParty since it was used for the DigitalSignature$_{OP}$ of the OrigParty.

The signature generator 130 then encrypts the generated massage digest (MD$_{OP}$) 212 and the ID of the HashFunction$_{OP}$ (HashFunction$_{OP}$ ID) 214 with the private encryption key of the OrigParty (OrigParty's PrivateKey). The signature generator then adds the OrigParty's ID 216 in clear text at the end of the encrypted items 212 and 214 to form the DigitalSignature$_{OP}$. The OrigParty's PrivateKey and ID are provided by the OrigParty with the user interface 112.

After the DigitalSignature$_{OP}$ 210 is generated, the ANProgram compiling preparer 128 appends it to the ANProgram code 202. Then, the ANProgram compiling preparer generates a message that the ANProgram 200 has been prepared for compiling by the server computer 104.

The OrigParty then issues with the user interface 112 a command to the network communications manager 120 to transmit the ANProgram 200 to the server computer 104, along with arguments specifying the architecture specific language into which the program is to be compiled (ASLanguage ID) and the compiler to be used (Compiler ID). The network communications manager retrieves the ANProgram from the trusted or untrusted object class repository 140 or 142 in which it is located and provides it to the network communications interface 116. The network communications manager then instructs the network communications interface to transmit the ANProgram to the server computer along with the specific arguments.

Compiling an Architecture Neutral Program

The transmitted ANProgram 200 is then received at the server computer 104. The server computer includes a CPU 150, a user interface 152, a memory 154, and a network communications interface 156. The network communications interface enables the server computer to communicate with the client computers 102 and the trusted key repository 106 via the network communications connection 108.

The memory 154 of the server computer 104 stores an operating system 158, a network communications manager 160, an ANProgram compiler 162, a signature verifier 164, an ANProgram integrity verifier 166, a signature generator 168, an ANProgram repository 170, and an ASProgram repository 172. The operating system is run on the CPU 150 and controls and coordinates running the programs 160–168 on the CPU in response to commands issued by a compiling party (CompParty) with the user interface 152.

The network communications interface 156 receives the ANProgram 200 and instructs the network communications manager 160 that this has occurred. In response, network communications manager places the received ANProgram in the ANProgram repository 170. It the server 104 is set up as an automatic compiler service, this is done automatically by the network communications manager 160. Otherwise, the ANProgram is moved into repository 170 by the network communications manager when the CompParty issues a command with the user interface.

Then, either automatically, or upon the issuance of a command by the CompParty with the user interface 252, the ANProgram compiler 162 is invoked to compile the ANProgram 200. Table 2 contains a pseudocode representation of the compilation procedure used by the ANProgram compiler to compile the ANProgram.

Referring to FIGS. 1–2 and Table 2, the ANProgram compiler 162 first calls the signature verifier 164 to verify the DigitalSignature$_{OP}$ 210 in the received ANProgram 200 so as to establish that the DigitalSignature$_{OP}$ 210 is actually the originating party's signature for the ANProgram (e.g., as opposed to being a forged signature or the OrigParty signature on some other version of the ANProgram). In particular, the signature verifier uses the ClearText OrigParty's ID 216 in the received ANProgram to obtain the OrigParty's PublicKey from the trusted key repository 106. Then the signature verifier decrypts the encrypted MD$_{OP}$ 212 and HashFunction$_{OP}$ ID 214 in the DigitalSignature$_{OP}$ using the public encryption key of the OrigParty (OrigParty's PublicKey).

Next, the signature verifier 164 generates a test message digest (TestMD$_{OP}$), which should match the decrypted MD$_{OP}$ 212, by computing the corresponding HashFunction$_{OP}$ on the ANProgram code 202 of the received ANProgram 200. The HashFunction$_{OP}$ ID 214 in the decrypted DigitalSignature$_{OP}$ is used to Identify the proper HashFunction$_{OP}$ to be used. The decrypted MD$_{OP}$ and the generated TestMD$_{OP}$ are then compared to verify the DigitalSignature$_{OP}$ 210.

If the MD$_{OP}$ 212 and the TestMD$_{OP}$ do not match, then the signature verifier 162 sends back a failed result to the ANProgram compiler 162. In response, the ANProgram compiler aborts the compiling procedure and generates an appropriate message.

On the other hand, if the MD$_{OP}$ and the TestMD$_{OP}$ do match, then the signature verifier 162 sends back a passed result to the ANProgram compiler 162 and the ANProgram compiler calls the ANProgram integrity verifier 166. It instructs the ANProgram integrity verifier to verify the integrity of the ANProgram code 202 of the received ANProgram 200. This is done in the same manner and for the same purpose as was described earlier in the section discussing preparing the ANProgram for compiling. Thus, if the ANProgram code does not satisfy the predefined integrity criteria, the ANProgram integrity verifier sends back a failed result to the ANProgram compiler. In response, the ANProgram compiler aborts the compiling procedure and generates an appropriate message indicating this.

Figure 3:
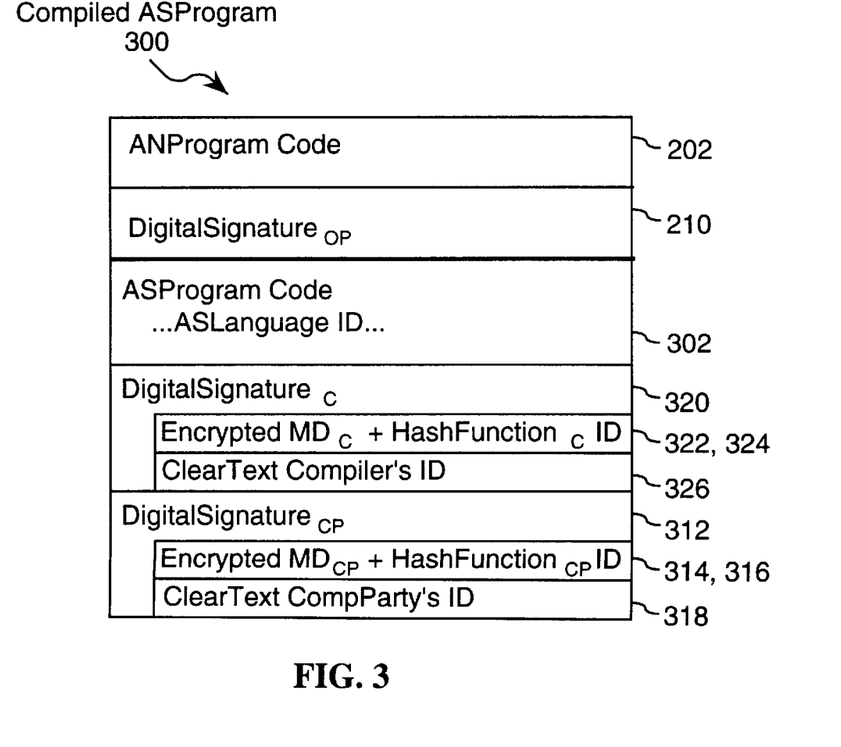
FIG. 3 depicts the structure of a compiled, architecture specific, program generated in accordance with a preferred embodiment of the present invention.

However, if the ANProgram code 202 of the received ANProgram 200 does satisfy the predefined integrity criteria, then the ANProgram integrity verifier 166 sends back a passed result to the ANProgram compiler 162. The ANProgram compiler then compiles the ANProgram code into the ASLanguage identified by the ASLanguage ID specified by the OrigParty. Referring now to FIGS. 1–3 and Table 2, the compiler places the ANProgram code 202, the DigitalSignature$_{OP}$ 210 and the compiled ASProgram code 302 in an ASProgram 300 that is stored in the ASProgram repository 172.

The ANProgram compiler 162 then calls the signature generator 168 and instructs it to generate the ANProgram compiler's digital signature (DigitalSignature$_C$) 320 which can be verified to ensure that the ASProgram 300 was compiled with the trusted ANProgram compiler. This is done in a manner similar to that described earlier for generating the DigitalSignature$_{OP}$. However, in this case, the set of information signed is the ASProgram code and the DigitalSignature$_{OP}$. Another predetermined hash function with a corresponding HashFunction$_C$ ID 324 may be used to generate the message digest MD$_C$ 322 of the set of information to be signed by the DigitalSignature$_C$, the private encryption key of the ANProgram compiler (Compiler's PrivateKey) is used to encrypt the MD$_C$ and the HashFunction$_C$ ID, and the identifier of the ANProgram compiler (Compiler's ID) is added in clear text at the end of the encrypted MD$_C$ and HashFunction$_C$. The Compiler's PrivateKey and ID are provided by the ANProgram compiler.

The ANProgram compiler 162 calls the signature generator 168 a second time to generate the CompParty's digital signature (DigitalSignature$_{CP}$) 312, which can be verified by end users to ensure that the ASProgram 300 was generated by the trusted CompParty. This is done in a similar manner to that described earlier for generating the DigtialSignature$_{OP}$ (in the section discussing preparing an ANProgram for compiling). However, here the message digest (MD$_{CP}$) 314 generated for the DigitalSignature$_{CP}$ is generated by computing a predetermined or selected hash function (HashFunction$_{CP}$) on the data bits of the ASProgram code, the DigitalSignatuer$_{OP}$ and the DigitalSignature$_C$. Similar to the HashFunction$_{OP}$, for purposes of this disclosure, the HashFunction$_{CP}$ corresponds to the CompParty since it was used for the DigitalSignature$_{CP}$ of the CompParty.

The signature generator 168 then encrypts the MD$_{CP}$ 314 and the ID of the HashFunction$_{CP}$ (HashFunction$_{CP}$ ID) 316 with the private encryption key of the CompParty (CompParty's PrivateKey). The signature generator then adds the identifier of the CompParty (CompParty's ID) 318 in clear text at the end of the encrypted items 314 and 316 to form the DigitalSignature$_{CP}$ 312. The CompParty's PrivateKey and ID are provided by the CompParty with the user interface 152.

After the DigitalSignature$_C$ 320 and the DigitalSignature$_{CP}$ 312 are generated, the ANProgram compiler 162 appends them to the ASProgram code 302, so that the resulting compiled ASProgram file or object has the following components in it:

ANProgram Code,

DigitalSignature$_{OP}$,

ASProgram Code,

DigitalSignature$_C$, and

DigitalSignature$_{CP}$.

Then, the ANProgram compiler generates a message that the ANProgram 200 has been compiled to form the ASProgram 300 and is ready to be sent to the OrigParty.

The CompParty then uses the network communications manager 160 to transmit the ASProgram 300 to the OrigParty's client computer 102. The network communications manager does so by retrieving the ASProgram from the ASProgram repository 172 in which it is located and provides it to the network communications interface 156. The network communications manager than instructs the network communications interface to transmit the ASProgram to the OrigParty's client computer.

Object and Object Class Creation and Distribution

The transmitted ASProgram 300 is then received by the communications interface 116 of the OrigParty's client computer and instructs the network communications manager 120 that this has occurred. In response, the OrigParty issues a command with the user interface 252 to instruct the network communications manager to retrieve the received ASProgram from the network communications interface, causing the network communications manager to place the received ASProgram in the untrusted object class repository 142 of the OrigParty's client computer. Once this is done, the OrigParty may treat the received ASProgram as a new object class with just one method (i.e. the compiled program code), or it may create an object class that includes the ASProgram 300 as well as other ANPrograms and ASPrograms.

Figure 4:
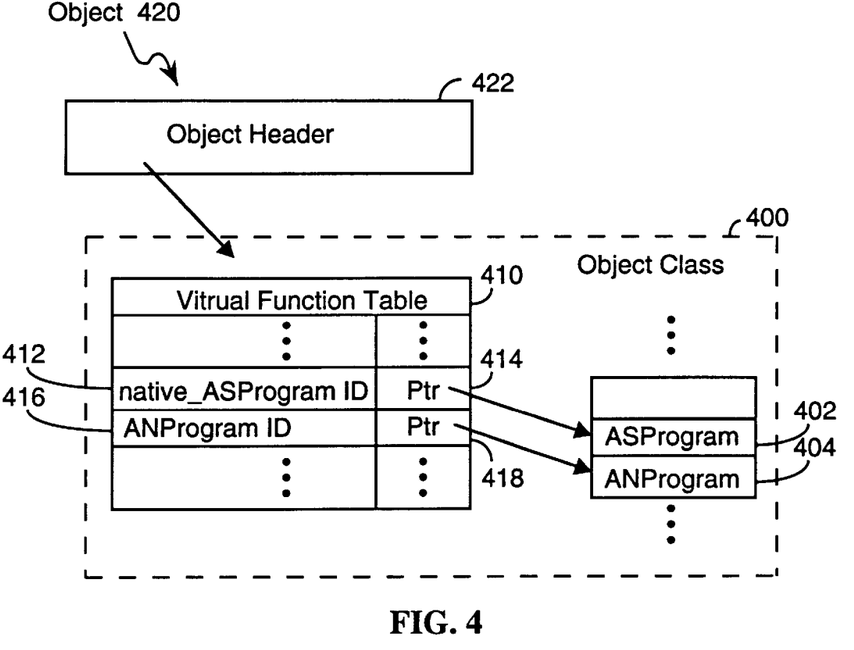
FIG. 4 depicts an object and associated object class in accordance with a preferred embodiment of the present invention.

FIG. 4 shows a typical object class 400 in accordance with the present invention. The object class may include one or more ASPrograms 402 and/or one or more ANPrograms 404, as well as a virtual function table 410. For each ASProgram, the virtual function table contains a corresponding identifier (native_ASProgram ID) 412 that indicates that it is an ASProgram (i.e., a native program) that is not in the ANLanguage and a corresponding pointer (Ptr) 414 to the native program. Similarly, for each ANProgram, the virtual function table contains a corresponding identifier (ANProgram ID) 416 and a corresponding pointer 418 to the ANProgram. Every object 420 of this object class includes an object header 422 that points to the object class 400.

Thus, the OrigParty may create an object 420 and an object class 400 with the ASProgram 300 that was received from the server computer 104 as one of the ASPrograms 402 in the object class.

When the OrigParty wishes to distribute to various ExecuteParties an object and object class that includes the ASProgram 300 and ANProgram, then the OrigParty issues a command with the user interface 112 to instruct the network communications manager to transmit these items to the client computer 102 of the ExecuteParties. The network communications manager does this by retrieving them from the untrusted object class repository 142 in which they are located and provides them to the network communications interface 116 with appropriate transmission instructions. Alternately, the network communications manager of the OrigParty may respond to a request initiated by an ExecuteParty for a copy of a specified object class 400.

Execution of Architecture Neutral Programs and Architecture Specific Programs in an Object Class The network communications interface 156 of the client computer 102 receives the transmitted object and object class and instructs the network communications manager 160 that this has occurred. In response, the ExecuteParty issues a command with the user interface 112 to instruct the network communications manager to retrieve the received object and object class from the network communications interface. The network communications manager then stores the received object and object class in the untrusted object class repository 142.

The untrusted object class repository 142 of each client computer 102 contains the objects and their associated object classes that are not trusted. These object classes are not trusted because any ANPrograms they include have not yet had their integrity verified and any ASPrograms they include have not had their source verified nor have been verified as being compiled from the proper ANProgram.

The trusted object class repository 140 of each client computer contains the objects and their object classes that are trusted. These object classes are trusted because any ANPrograms they include may have already had their integrity verified by the ANProgram integrity verifier 136 and any ASPrograms they contain have been ascertained to be trustworthy. In fact, some or all the object classes in the trusted object class repository 140 need not have digital signatures, because these object classes are trusted and therefore there is no reason to perform integrity checks on the methods in these object classes.

It is desirable to have an object class that primarily includes ANPrograms but may also include ASPrograms so that essentially all legitimate tasks can be performed with the object class, as suggested earlier. Therefore, the ANProgram executer 122 is capable of executing integrity verifiable ANPrograms and calling the ASProgram executer to execute integrity non-verifiable ASPrograms that are either (1) in trusted object classes in the trusted object class repository 140, or (2) that are in untrusted object classes in the untrusted object class repository 142 and have verifiable DigitalSignature$_{OP}$, DigitalSignature$_{CP}$ and DigitalSignature$_C$ information so that essentially all legitimate tasks can be performed. In this way, ASPrograms of untrusted object classes that don't have DigitalSignature$_{OP}$, DigitalSignature$_{CP}$ and DigitalSignature$_C$ information or whose digital signatures cannot be verified are prevented from being executed. Table 3 contains a pseudocode representation of the execution procedure used by the ANProgram executer.

Referring to FIGS. 1–4 and Table 3, at the client computer 102 of an ExecuteParty (e.g., the OrigParty or another party), the ANProgram executer 124 may be executing an ANProgram that seeks to call a method in a specified object class. The method call is initially handled by the object class loader 136, which determines whether or not the object class has already been loaded. If the object class has already been loaded into the ExecuteParty's user address space 138, then the ANProgram executer 122 executes the called method if the called method is an ANProgram and the ASProgram executer 124 executes the called method if the called method is an ASProgram.

However, if the object class has not yet been loaded into the ExecuteParty's address space 138, then the object class loader 136 loads the object class into the ExecuterParty's address space and determines whether or not execution of the called method is to be allowed. For instance, if the object class was loaded from the trusted object class repository 140, then execution of the called method is permitted and the Execute procedure is called. The Execute procedure (see Table 3) calls the ANProgram executer if the called method is an ANProgram, and otherwise calls the ASProgram executer 124 to execute the called method.

However, if the object class was loaded from the untrusted object class repository 142, the class loader 136 examines the object header of the object to determine if its object class includes any ASPrograms. It does so by determining if there any native_ASProgram IDs in the virtual function table of the object.

If there are no ASPrograms in the object class, then the class loader 136 calls the ANProgram integrity verifier 136 to verify the integrity of the ANPrograms in the object class. This is done in the same manner and for the same purpose as was described earlier for verifying the integrity of the ANProgram 200 (in the section discussing compiling an ANProgram). Thus, if the integrity of any of the ANPrograms is not verified, then the ANProgram integrity verifier passes back to the class loader a failed result and the class loader aborts the class loading procedure and generates an appropriate message indicating this. But, if the ANProgram integrity verifier sends back a passed result indicating that all of the ANPrograms of the object class are verified, the class loader enables execution of the called method.

If there are any ASPrograms in the object class, then the class loader 136 calls the signature verifier 132 to verify the compiler signature DigitalSignature$_C$ and the CompParty signature DigitalSignature$_{CP}$. If any of the ASPrograms does not include a DigitalSignature$_{CP}$ and a DigitalSignature$_C$, the integrity of the ASProgram's source cannot be verified and therefore the signature verifier sends back to the ANProgram executer a failed result. In response, the class loader aborts the object class loading procedure and generates an appropriate message that this has occurred.

Further, if all of the ASPrograms in the object class do include a DigitalSignature$_{CP}$ and a DigitalSignature$_C$, the identities of the CompParty and the Compiler as indicated in these two digital signatures, are compared with the lists 144 (see FIG. 1) of known, trusted Compiler Parties and trusted Compilers. If any of the ASPrograms in the object class were compiled by a CompParty or a Compiler not included in the set of known, trusted Compiler Parties and trusted Compilers, the class loading procedure is aborted, and execution of the called method is thereby blocked. Similarly, if the ASLanguage identified in any of the ASPrograms does not match the ASLanguage used by the ASProgram Executer 124, the class loading procedure is aborted.

However, if all of the ASPrograms in the object class do include a DigitalSignature$_{CP}$ and a DigitalSignature$_C$, and the identified CompParty and Compiler for all the ASPrograms are trusted Compiler Parties and Compilers, and the ASLanguage used by all the ASPrograms is one used by the ASProgram Executer, then the signature verifier verifies these signatures in a similar manner as was described earlier for verifying the DigitalSignature$_{OP}$ (in the section discussing compiling the ANProgram 200). However, in this case, the Compiler's and CompParty's public keys are retrieved from the trusted key repository 106 and respectively used to decrypt the MD$_C$ and HashFunction$_C$ ID in the DigitalSignature$_C$ and the MD$_{CP}$ and the ashFunction$_{CP}$ ID in the DigitalSignature$_{CP}$. Furthermore, the test message digests (TestMD$_C$ and TestMD$_{CP}$) corresponding to the decrypted MD$_{CP}$ and MD$_C$ are generated by computing hash codes on the data bits of the ASProgram code plus the DigitalSignature$_{OP}$ for the TestMD$_C$ and on the same data bits plus the DigitalSignature$_C$ for the TestMD$_{CP}$, according respectively to the HashFunction$_C$ and HashFunction$_{CP}$ identified by the decrypted HashFunction$_C$ ID and HashFunction$_{CP}$ ID.

If the DigitalSignature$_C$ and/or the DigitalSignature$_{CP}$ is not verified (i.e., MD$_C \ne$ TestMD$_C$ and/or MD$_{CP} \ne$ TestMD$_{CP}$) for every ASProgram, then the signature verifier 136 sends back to the class loader 136 a failed result. In response, the class loader aborts the class loading procedure and generates an appropriate message that this has occurred.

However, if the DigitalSignature$_C$ and the DigitalSignature$_{CP}$ are both verified (i.e., MD$_C$=TestMD$_C$ and MD$_{CP}$=TestMD$_{CP}$) for every ASProgram, then the ANProgram executer 124 again calls signature verifier 132 to verify the OrigParty's signatures (DigitalSignature$_{OP}$) for the ANPrograms from which the ASPrograms were compiled. To verify the OrigParty digital signatures, the DigitalSignature$_{OP}$ of each is verified in the same manner as was discussed earlier in the section concerning compilation of the ANProgram 200.

If the DigitalSignature$_{OP}$ of each of the ANPrograms from which the ASPrograms were compiled is verified, then the class loader calls the ANProgram integrity verifier to verify the integrity of every ANProgram in the object class and the ANPrograms from which the ASPrograms were compiled. This is done in the same manner as was described earlier. If the integrity of any of these ANPrograms is not verified, then the ANProgram integrity verifier sends back to the class loader a failed result, which aborts the class loading procedure and generates an appropriate message.

However, if the integrity of each of the ANPrograms is verified, then the ANProgram integrity verifier 126 sends back a passed result to the class loader 136. In response, the class loader invokes the ANProgram executer or ASProgram executer to execute the called method, as appropriate.

In view of the foregoing, the ExecuterParty is assured that only those untrusted object classes in the untrusted repository 142 that have integrity verifiable ANPrograms and ASPrograms whose digital signatures can be verified will be loaded and have their programs executed.

Alternative Embodiments

Some of the features of the invention described above are optional. Thus, those skilled in the art will recognize that alternative embodiments exist that don't include these features.

For example, the ANProgram compiler has been described as generating both a DigitalSignature$_{CP}$ and a DigitalSignature$_C$ respectively for the CompParty and the ANProgram compiler. However, the ANProgram compiler could be constructed simply to generate only one of these digital signatures for enabling verification of the either the compiler used to compile the ASProgram or the compiling party.

Similarly, the program executer has been described as requiring verification of both a DigitalSignature$_{CP}$ and a DigitalSignature$_C$. However, the program executer could be constructed to require verification of only one of these digital signatures and optionally verify the other digital signature if the ASProgram being verified includes it. Furthermore, the program executer could be constructed to skip the step of verifying the integrity of the ANProgram corresponding to each ASProgram, based on the assumption that the compiling party is trusted and that it is a duty of the compiling party to verify the integrity of each ANProgram that is compiles into an ASProgram prior to performing the compilation.

When the ExecuterParty is the OrigParty, the ExecuterParty knows that it actually sent the ANProgram 200 to the CompParty's server computer 104 to be compiled into the ASProgram 300. In this case, the class loader 136 could be constructed to not call the signature verifier to verify the DigtialSignature$_{OP}$ in the ANProgram. Rather, the ExecuterParty can simply compare the DigtialSignature$_{OP}$ in the local copy of the ANProgram with the DigtialSignature$_{OP}$ in the compiled ASProgram. Additionally, the class loader could be constructed to not call the ANProgram integrity verifier 126 to verify the integrity of the ANProgram corresponding to a called ASProgram since the integrity of the ANProgram would have been checked during the preparation for compiling procedure prior to being sent to the compiling server computer. Afternatively, the ANProgram compiling preparer 128 could be constructed to not call the ANProgram integrity verifier during the preparation for compiling procedure since its integrity would be checked both by the compiler and when the class loader calls the ANProgram integrity verifier prior to execution of the corresponding ASProgram.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

Pseudocode Representation of Method of Preparing
Architecture Neutral Program for Compiling

```
Procedure: Prepare for Compiling
    (ANProgram code, OrigParty's PrivateKey, and OrigParty's ID)
    {
    Verify integrity of ANProgram with ANProgram integrity verifier
    If failed result
        { abort and generate failed result message }
    Generate MD_OP = HashFunction_OP (ANProgram code)
    Generate DigitalSignature_OP =
        Encrypt (MD_OP + HashFunction_OP ID,
        OrigParty's PrivateKey) + ClearText (OrigParty's ID)
    Append DigitalSignature_OP to ANProgram code
    Generate message that ANProgram is prepared for compiling
    Return
    }
```

TABLE 2

Pseudocode Representation of Method of
Compiling ANProgram and Generating ASProgram

```
Procedure: Compile (ANProgram, CompParty's ID, ASLanguageID,
    CompParty's PrivateKey, Compiler's ID, and
    Compiler's PrivateKey)
    {
    Retrieve OrigParty's PublicKey from trusted key repository using
        ClearText OrigParty's ID in DigitalSignature_OP
    Decrypt (MD_OP + HashFunction_OP ID in DigitalSignature_OP,
        OrigParty's PublicKey)
    Generate TestMD_OP = HashFunction_OP (ANProgram code) using
        HashFunction_OP identified by decrypted HashFunction_OP ID
    Compare decrypted MD_OP and TestMD_OP
    If decrypted MD_OP ≠ TestMD_OP
        {
        /* DigitalSignature_OP of OrigParty not verified */
        Generate failed result message
        }
    Else
        {
        /* DigitalSignature_OP of OrigParty has been verified */
        Verify integrity of ANProgram with ANProgram integrity
            verifier
        If failed result
            {
            abort and generate failed result message
            }
        Else
            {
            /* ANProgram has been verified */
            Compile ANProgram code into ASLanguage identified by
                ASLanguage ID to generate ASProgram code
            Generate MD_C = HashFunction_CS (ASProgram code +
                DigitalSignature_OP)
            Generate DigitalSignature_C = Encrypt (MD_C +
                HashFunction_C ID, ANProgram Compiler's
                PrivateKey) + ClearText ANProgram Compiler's ID
            Generate MD_CP = HashFunction_CP (ASProgram code +
                DigitalSignature_OP + DigitalSignature_C)
            Generate DigitalSignature_CP = Encrypt (MD_CP +
                HashFunction_CP ID, CompParty's PrivateKey) +
                ClearText CompParty's ID
            Generate and Return File or Object containing:
                ANProgram Code,
                DigitalSignature_OP,
                ASProgram Code,
                DigitalSignature_C, and
                DigitalSignature_CP
            /* ASProgram has been compiled and generated */
            }
        }
    }
```

TABLE 3

Pseudocode Representation of Method of
Executing Architecture Specific Program

```
Procedure: Execute (ObjectClass, Program)
    {
    If the Program is a verifiable program
        { Execute Program using the Bytecode Interpreter }
    Else
        { Execute Program using the compiled program executer }
    }
Procedure: ClassLoad (ObjectClass, Program)
    {
    If Object Class has already been loaded into ExecuterParty's address
        space
        {
        Call Execute (ObjectClass, Program)
        Return
        }
    /* The Object Class has not been loaded */
    Load Object Class into ExecuterParty's address space
    If Object Class was loaded from Trusted Object Class Repository
        {
        Call Execute (ObjectClass, Program)
        Return
        }
    /* Object Class was loaded from Untrusted Object Class
        Repository */
    If Object Class does not contain any ASPrograms designated as
        native_ASPrograms in Object Header of Object
        {
        Verify integrity of all ANPrograms of Object Class with
            ANProgram integrity verifier
        If failed result
            {
            Abort with appropriate failed result message
            }
        Else
            /* Integrity of all ANPrograms of Object Class have been
                verified */
            { Call Execute (ObjectClass, Program) }
        Return
        }
    /* Object Class does contain ASPrograms designated as
        native_ASPrograms in Object Header of Object */
    If any ASProgram does not contain a DigitalSignature_CP and a
        DigitalSignature_C
        {
        /* Compiling Party and Compiler of every ASProgram cannot be
            verified */
        Generate appropriate message
        Return
        }
    For each ASProgram in Object Class:
        { Determine identity of CompParty and Compiler and
            determine ASLanguage used by ASProgram }
    If identity of CompParty for any ASProgram is not a known, trusted,
        Compiling Party, or the identity of Compiler is not a known,
        trusted Compiler, or the identified ASLanguage is not one used
        by the ASProgram Executer
        {
        Generate appropriate message
        Return
        }
    For each ASProgram in Object Class:
        {
        Retrieve CompParty's PublicKey from trusted key repository
            using ClearText CompParty's ID in DigitalSignature_CP
        Decrypt (MD_CP + HashFunction_CP ID in DigitalSignature_CP,
            CompParty's PublicKey)
        Generate TestMD_CP = HashFunction_CP (ASProgram code +
            DigitalSignature_OP + DigitalSignature_C in ASProgram)
            using HashFunction_CP identified by decrypted
            HashFunction_CP ID
        Compare decrypted MD_CP and TestMD_CP
        }
    If decrypted MD_CP ≠ TestMD_CP for any ASProgram
        {
        /* DigitalSignature_CP for every ASProgram has not been
            verified */
```

TABLE 3-continued

Pseudocode Representation of Method of
Executing Architecture Specific Program

```
        Generate appropriate failed result message
        Return
        }
/* DigitalSignature_CP for every ASProgram has been verified*/
For each ASProgram in Object Class:
    {
    Retrieve ANProgram Compiler's PublicKey from trusted key
        repository using ClearText ANProgram Compiler's ID in
        DigitalSignature_C
    Decrypt (MD_C + HashFunction_C ID in DigitalSignature_C, ANProgram
        Compiler's PublicKey)
    Generate TestMD_C = HashFunction_C (ASProgram code +
        DigitalSignature_OP) using HashFunction_C identified by decrypted
        HashFunction_C ID
    Compare decrypted MD_C and TestMD_C
    }
If decrypted MD_C ≠ TestMD_C for any ASProgram
    {
    /* DigitalSignature_C for every ASProgram in Object Class has not
        been verified */
    Generate appropriate failed result message
    Return
    }
/* DigitalSignature_C for every ASProgram in Object Class has been
    verified */
For each ANProgram from which an ASProgram in Object Class was
    compiled:
    {
    Retrieve OrigParty's PublicKey from trusted key repository using
        ClearText OrigParty's ID in DigitalSignature_CP
    Decrypt (MD_OP + HashFunction_OP ID in DigitalSignature_OP,
        OrigParty's PublicKey)
    Generate TestMD_OP = HashFunction_OP (ANProgram code) using
        HashFunction_OP identified by decrypted HashFunction_OP ID
    Compare decrypted MD_OP and TestMD_OP
    }
If decrypted MD_OP ≠ TestMD_OP for any ANProgram
    {
    /* DigitalSignature_OP for every ANProgram from which an
        ASProgram in Object Class was compiled not verified */
    Generate failed result message
    Return
    }
/* The DigitalSignature_OP in every ASProgram in Object Class is verified
    */
Verify integrity of ANPrograms in Object class and ANPrograms from
    which ASPrograms in Object Class were compiled with ANProgram
    integrity verifier
If failed result
    {
    Generate failed result message
    Return
    }
/* Integrity of all ANPrograms in Object class and all ANPrograms from
    which ASPrograms in Object Class were compiled have been verified
    */
Call Execute (ObjectClass, Program)
}
```

What is claimed is:

1. A computer network that comprises:

a program compiling computer operated by a compiling party, the program compiling computer receiving an architecture neutral program generated by an originating party, the architecture neutral program containing architecture neutral program code and a digital signature of the originating party that when verified verifies that the architecture neutral program was signed by the originating party, the program compiling computer including;

a signature verifier that verifies the originating party's digital signature;

a program verifier for verifying that the received architecture neutral program satisfies predefined integrity criteria including predefined operand stack and data type usage restrictions;

a compiler that generates an architecture specific program when the originating party's digital signature has been verified and the received architecture neutral program's integrity has been verified by the program verifier, the compiler generating the architecture specific program by (A) compiling the architecture neutral program code into architecture specific program code in an architecture specific language, and (B) appending a digital signature of the compiling party that when verified verifies that the architecture specific program was generated by the compiling party; and a signature generator that generates the compiling party's digital signature; and a program executing computer operated by an executing party, the program executing computer receiving the architecture specific program, the program executing computer including:

a signature verifier that verifies the compiling party's digital signature;

an executer that executes program code that is in the architecture specific language, the executer executing the architecture specific program code when the compiling party's signature has been verified;

a program verifier for verifying whether a specified architecture neutral program satisfies said predefined integrity criteria, including predefined operand stack and data type usage restrictions; and an architecture neutral program executer for executing the specified architecture neutral program when the program verifier has verified that the specified architecture neutral program satisfies said predefined integrity criteria;

whereby verification of the compiling party's digital signature by the program executing computer indirectly verifies the originating party's signature as well as the integrity of the architecture neutral program from which the architecture specific program was compiled.

2. A computer network as in claim 1 wherein:

the architecture neutral program is a Java bytecode program and program verifier is a Java bytecode program verifier; and the executer executes said architecture specific program code only when the compiling party is a member of a defined set of trusted compiling parties.

3. A computer network as in claim 1 wherein:

the signature generator generates a digital signature of the compiler that when verified verifies that the architecture specific program was generated with the compiler;

the compiler generating the architecture specific program further by appending to the architecture specific program code the compiler's digital signature;

the executing computer's signature verifier verifies the compiler's digital signature;

the executer executing the architecture specific program code only after the compiler's digital signature has been verified.

4. A computer network as in claim 3 wherein:

the architecture neutral program is a Java bytecode program and program verifier is a Java bytecode program verifier; and the executer executes said architecture specific program code only when the compiling party is a member of a defined set of trusted compiling parties and the compiler is a member of a defined set of trusted compilers.

5. A computer network as in claim 1 wherein:

for the originating and compiling parties, said network includes corresponding private and public encryption keys and corresponding hash functions;

the originating party's digital signature includes a message digest of the architecture neutral program generated by performing the originating party's corresponding hash function on the architecture neutral program, the message digest of the architecture neutral program being encrypted with the originating party's corresponding private key;

the program compiling computers' signature verifier includes instructions for verifying the originating party's digital signature by (A) decrypting the message digest of the architecture neutral program with the originating party's public encryption key, (B) generating a corresponding test message digest of the architecture neutral program by performing the originating party's hash function on the architecture neutral program code, and (C) comparing the decrypted message digest and the test message digest of the architecture neutral program;

the signature generator includes instructions for generating the compiling party's digital signature by (A) generating a message digest of the architecture neutral program generated by performing the compiling party's corresponding hash function on the architecture specific program code, and (B) encrypting the message digest of the architecture specific program with the compiling party's corresponding private key; and the program executing computer's signature verifier includes instructions for verifying the compiling party's digital signature by (A) decrypting the message digest of the architecture specific program with the compiling party's public encryption key, (B) generating a corresponding test message digest of the architecture specific program by performing the compiling party's hash function on the architecture specific program code, and (C) comparing the decrypted message digest and the test message digest of the architecture specific program.

6. A computer network as in claim 1 wherein:

the architecture neutral program is a Java bytecode program;

the program executing computer receives or originates the architecture neutral program and further includes a Java bytecode program integrity verifier that verifies the integrity of the architecture neutral program code by verifying that the architecture neutral program code satisfies predefined program integrity criteria;

the executer executes the architecture specific program code only after the integrity of the architecture neutral program code has been verified.

7. A computer network as in claim 1 further comprising:

a program originating computer that provides the architecture neutral program, the program originating computer including:

a signature generator that generates an originating party's digital signature that is appended to the architecture neutral program code;

the program compiling computer communicating with the program originating computer to receive the architecture neutral program from the program originating computer and to provide the architecture specific program to the program originating computer;

the program executing computer communicating with the program originating computer to receive the architecture neutral and specific programs from the program originating computer;

the program executing computer's signature verifier also verifying the originating party's digital signature;

the executer executing the architecture specific program only after the originating party's digital signature has been verified.

8. A computer network as in claim 1 wherein:

the program executing computer also originates the architecture neutral program, the program executing computer includes a signature generator for generating the originating party's digital signature that signs said architecture neutral program and that is appended to the architecture neutral program code;

the program compiling computer communicates with the program executing computer to receive the architecture neutral program from the program executing computer and to provide the architecture specific program to the program executing computer.

9. A method of operating a computer network comprising the steps of:

at a program compiling computer operated by a compiling party:

receiving an architecture neutral program generated by an originating party, the architecture neutral program containing architecture neutral program code and a digital signature of the originating party that when verified verifies that the architecture neutral program was signed by the originating party;

verifying the originating party's digital signature;

verifying that the received architecture neutral program satisfies predefined integrity criteria including predefined operand stack and data type usage restrictions; and compiling the architecture neutral program with a compiler so as to generate an architecture specific program when the originating party's digital signature has been verified and the integrity of the architecture neutral program has been verified, and appending a digital signature of the compiling party that when verified verifies that the architecture specific program was generated by the compiling party; and at a program executing computer operated by an executing party:

receiving the architecture specific program and receiving or originating the architecture neutral program;

verifying the compiling party's digital signature;

executing the architecture specific program when the compiling party's signature has been verified;

verifying whether a specified architecture neutral program satisfies said predefined integrity criteria, including predefined operand stack and data type usage restrictions; and executing the specified architecture neutral program when the program verifier has verified that the specified architecture neutral program satisfies said predefined integrity criteria;

whereby verification of the compiling party's digital signature by the program executing computer indirectly verifies the originating party's signature as well as the integrity of the architecture neutral program from which the architecture specific program was compiled.

10. The method of claim 9 wherein:

the architecture neutral program is a Java bytecode program and program verifier is a Java bytecode program verifier; and the program executing computer executes said architecture specific program only when the compiling party is a member of a defined set of trusted compiling parties.

11. The method of claim 9, including:

at the program compiling computer:
generating a digital signature of the compiler that when verified verifies that the architecture specific program was generated with the compiler; and
appending to the architecture specific program code the compiler's digital signature; and at the program executing computer:
verifying the compiler's digital signature; and
executing the architecture specific program only after the compiler's digital signature has been verified.

12. The method of claim 11, including:

the architecture neutral program is a Java bytecode program and program verifier is a Java bytecode program verifier; and at the program executing computer: executing the architecture specific program only when the compiling party is a member of a defined set of trusted compiling parties and the compiler is a member of a defined set of trusted compilers.

13. The method of claim 9, wherein for the originating and compiling parties, said network includes corresponding private and public encryption keys and corresponding hash functions;

the originating party's digital signature includes a message digest of the architecture neutral program generated by performing the originating party's corresponding hash function on the architecture neutral program, the message digest of the architecture neutral program being encrypted with the originating party's corresponding private key;

said method including the steps of:

at the program compiling computer
verifying the originating party's digital signature by (A) decrypting the message digest of the architecture neutral program with the originating party's public encryption key, (B) generating a corresponding test message digest of the architecture neutral program by performing the originating party's hash function on the architecture neutral program code, and (C) comparing the decrypted message digest and the test message digest of the architecture neutral program; and
generating the compiling party's digital signature by (A) generating a message digest of the architecture neutral program generated by performing the compiling party's corresponding hash function on the architecture specific program code, and (B) encrypting the message digest of the architecture specific program with the compiling party's corresponding private key; and at the program executing computer:
verifying the compiling party's digital signature by (A) decrypting the message digest of the architecture specific program with the compiling party's public encryption key, (B) generating a corresponding test message digest of the architecture specific program by performing the compiling party's hash function on the architecture specific program code, and (C) comparing the decrypted message digest and the test message digest of the architecture specific program.

14. The method of claim 9, including:

the architecture neutral program is a Java bytecode program;

at the program executing computer:
receiving or originating the architecture neutral program;
verifying the integrity of the architecture neutral program code by verifying that the architecture neutral program code satisfies predefined program integrity criteria; and
executing the architecture specific program code only after the integrity of the architecture neutral program code has been verified.

15. The method of claim 9, further including:

at a program originating computer that provides the architecture neutral program:
generating the originating party's digital signature and appending it to the architecture neutral program code;

at the program compiling computer:
communicating with the program originating computer to receive the architecture neutral program from the program originating computer and to provide the architecture specific program to the program originating computer;

at the program executing computer:
communicating with the program originating computer to receive the architecture neutral and specific programs from the program originating computer;
verifying the originating party's digital signature; and
executing the architecture specific program only after the originating party's digital signature has been verified.

16. The method of claim 9, including:

at the program executing computer:
providing the architecture neutral program;
generating an originating party's digital signature that signs said architecture neutral program and appending it to the architecture neutral program code; and at the program compiling computer:
communicating with the program executing computer to receive the architecture neutral program from the program executing computer and to provide the architecture specific program to the program executing computer.

17. A system for distributing code stored on computer-readable media and executable by computers, the code including a plurality of modules each configured to carry out at least one function to be executed by one of the computers, the system comprising:

a first module configured for use in conjunction with a program compiling computer, operated by a compiling party, that receives an architecture neutral program generated by an originating party, the architecture neutral program containing architecture neutral program code and a digital signature of the originating party that when verified verifies that the architecture neutral program was signed by the originating party, the first module including;
a signature verifier that verifies the originating party's digital signature;
a program verifier for verifying that the received architecture neutral program satisfies predefined integrity criteria including predefined operand stack and data type usage restrictions;

a compiler that generates an architecture specific program when the originating party's digital signature has been verified and the received architecture neutral program's integrity has been verified by the program verifier, the compiler generating the architecture specific program by (A) compiling the architecture neutral program code into architecture specific program code in an architecture specific language, and (B) appending a digital signature of the compiling party that when verified verifies that the architecture specific program was generated by the compiling party; and a signature generator that generates the compiling party's digital signature; and a second module for use in conjunction with a program executing computer, operated by an executing party, that receives the architecture specific program, the second module including:

a signature verifier that verifies the compiling party's digital signature;

an executer that executes program code that is in the architecture specific language, the executer executing the architecture specific program code when the compiling party's signature has been verified;

a program verifier for verifying whether a specified architecture neutral program satisfies said predefined integrity criteria, including predefined operand stack and data type usage restrictions; and an architecture neutral program executer for executing the specified architecture neutral program when the program verifier has verified that the specified architecture neutral program satisfies said predefined integrity criteria;

whereby verification of the compiling party's digital signature by the signature verifier in the second module indirectly verifies the originating party's signature as well as the integrity of the architecture neutral program from which the architecture specific program was compiled.

18. A system as in claim 17 wherein:

the architecture neutral program is a Java bytecode program and program verifier is a Java bytecode program verifier; and the executer executes said architecture specific program code only when the compiling party is a member of a defined set of trusted compiling parties.

19. A system as in claim 17 wherein:

the signature generator generates a digital signature of the compiler that when verified verifies that the architecture specific program was generated with the compiler;

the first module appends to the architecture specific program code the compiler's digital signature;

the second module's signature verifier verifies the compiler's digital signature;

the second module's executer executes the architecture specific program code only after the compiler's digital signature has been verified.

20. A system as in claim 19 wherein:

the architecture neutral program is a Java bytecode program and program verifier is a Java bytecode program verifier; and the second module's executer executes said architecture specific program code only when the compiling party is a member of a defined set of trusted compiling parties and the compiler is a member of a defined set of trusted compilers.

21. A system as in claim 17 wherein:

for the originating and compiling parties, said system includes corresponding private and public encryption keys and corresponding hash functions;

the originating party's digital signature includes a message digest of the architecture neutral program generated by performing the originating party's corresponding hash function on the architecture neutral program, the message digest of the architecture neutral program being encrypted with the originating party's corresponding private key;

the first module's signature verifier includes instructions for verifying the originating party's digital signature by (A) decrypting the message digest of the architecture neutral program with the originating party's public encryption key, (B) generating a corresponding test message digest of the architecture neutral program by performing the originating party's hash function on the architecture neutral program code, and (C) comparing the decrypted message digest and the test message digest of the architecture neutral program;

the first module's signature generator includes instructions for generating the compiling party's digital signature by (A) generating a message digest of the architecture neutral program generated by performing the compiling party's corresponding hash function on the architecture specific program code, and (B) encrypting the message digest of the architecture specific program with the compiling party's corresponding private key; and the second module's signature verifier includes instructions for verifying the compiling party's digital signature by (A) decrypting the message digest of the architecture specific program with the compiling party's public encryption key, (B) generating a corresponding test message digest of the architecture specific program by performing the compiling party's hash function on the architecture specific program code, and (C) comparing the decrypted message digest and the test message digest of the architecture specific program.

22. A system as in claim 17 wherein:

the architecture neutral program is a Java bytecode program;

the program executing computer receives or originates the architecture neutral program;

the second module further includes a Java bytecode program integrity verifier that verifies the integrity of the architecture neutral program code by verifying that the architecture neutral program code satisfies predefined program integrity criteria;

the second module's executer executes the architecture specific program code only after the integrity of the architecture neutral program code has been verified.

23. A system as in claim 17, said system including a third module for use in conjunction with a program originating computer that provides the architecture neutral program, the third module including:

a signature generator that generates an originating party's digital signature that is appended to the architecture neutral program code;

the first module communicating with the third module to receive the architecture neutral program from the program originating computer and to provide the architecture specific program to the program originating computer;

the second module communicating with the third module to receive the architecture neutral and specific programs from the program originating computer;

the second module's signature verifier also verifying the originating party's digital signature;

the second module's executer executing the architecture specific program only after the originating party's digital signature has been verified.

24. A system as in claim 17 wherein:

the program executing computer also originates the architecture neutral program, the second module including a signature generator that generates the originating party's digital signature and instructions for appending the originating party's digital signature to the architecture neutral program code; and the first module communicates with the second module to receive the architecture neutral program from the program executing computer and to provide the architecture specific program to the program executing computer.

25. A computer program product for use in conjunction with one or more computer systems, the computer program product comprising a computer readable storage medium and a computer program mechanism embedded therein, the computer program mechanism comprising:

a first module configured for use in conjunction with a program compiling computer, operated by a compiling party, that receives an architecture neutral program generated by an originating party, the architecture neutral program containing architecture neutral program code and a digital signature of the originating party that when verified verifies that the architecture neutral program was signed by the originating party, the first module including;

a signature verifier that verifies the originating party's digital signature;

a program verifier for verifying that the received architecture neutral program satisfies predefined integrity criteria including predefined operand stack and data type usage restrictions;

a compiler that generates an architecture specific program when the originating party's digital signature has been verified and the received architecture neutral program's integrity has been verified by the program verifier, the compiler generating the architecture specific program by (A) compiling the architecture neutral program code into architecture specific program code in an architecture specific language, and (B) appending a digital signature of the compiling party that when verified verifies that the architecture specific program was generated by the compiling party; and a signature generator that generates the compiling party's digital signature; and a second module for use in conjunction with a program executing computer, operated by an executing party, that receives the architecture specific program, the second module including:

a signature verifier that verifies the compiling party's digital signature;

an executer that executes program code that is in the architecture specific language, the executer executing the architecture specific program code when the compiling party's signature has been verified;

a program verifier for verifying whether a specified architecture neutral program satisfies said predefined integrity criteria, including predefined operand stack and data type usage restrictions; and an architecture neutral program executer for executing the specified architecture neutral program when the program verifier has verified that the specified architecture neutral program satisfies said predefined integrity criteria;

whereby verification of the compiling party's digital signature by the program executing computer indirectly verifies the originating party's signature as well as the integrity of the architecture neutral program from which the architecture specific program was compiled.

26. The computer program product of claim 25, wherein the signature generator generates a digital signature of the compiler that when verified verifies that the architecture specific program was generated with the compiler;

the first module appends to the architecture specific program code the compiler's digital signature;

the second module's signature verifier verifies the compiler's digital signature; and the second module's executer executes the architecture specific program code only after the compiler's digital signature has been verified and only when the compiling party is a member of a defined set of trusted compiling parties and the compiler is a member of a defined set of trusted compilers.

* * * * *